United States Patent [19]

Negro

[11] 4,083,569
[45] Apr. 11, 1978

[54] FRONTAL SEAL, IN PARTICULAR FOR TRACKED VEHICLES

[76] Inventor: Giorgio Negro, via Centallo 62/45, Torino, Italy

[21] Appl. No.: 666,397

[22] Filed: Mar. 12, 1976

Related U.S. Application Data

[63] Continuation-in-part of Ser. No. 542,832, Jan. 21, 1975, abandoned.

[30] Foreign Application Priority Data

Jan. 21, 1974    Italy ................................ 67159 A/74

[51] Int. Cl.² ............................................. F16J 15/38
[52] U.S. Cl. ..................................... 277/92; 277/117
[58] Field of Search ................ 277/92, 117, 96 R, 42, 277/96.1; 305/41, 42; 308/15

[56] References Cited

U.S. PATENT DOCUMENTS

| | | | |
|---|---|---|---|
| 3,241,844 | 3/1966 | Morley | 277/92 |
| 3,322,431 | 5/1967 | Solari | 277/92 |
| 3,452,995 | 7/1969 | Engelking | 277/92 |
| 3,584,886 | 6/1971 | Simpson et al. | 277/92 |

Primary Examiner—Richard E. Aegerter
Assistant Examiner—L. Footland

[57] ABSTRACT

A frontal seal for tracked vehicles comprises two rings one of which slides on the other with a certain pressure exerted by resilient members coaxially mounted on each ring. The rings comprise a frusto-conical portion provided, in correspondence of the major base, with an outwardly directed radial flange, whose surface opposed to the ring body forms the friction surface of the ring, and a cylindrical portion adjacent to the frusto-conical portion and joined thereto in correspondence of the minor base thereof. The resilient members comprise an annular body which in cross section is composed by a trapezoid and a circle tangent to one of the non parallel sides of the trapezoid. In the assembled seal the portion with circular cross section is also tangent to the ring body in correspondence of the junction line between the cylindrical and the frusto-conical portions thereof.

1 Claim, 8 Drawing Figures

FRONTAL SEAL, IN PARTICULAR FOR TRACKED VEHICLES

This application is a continuation-in-part application of co-pending application Ser. No. 542,832 filed on Jan. 21, 1975, now abandoned.

The present invention relates to a frontal seal, in particular for tracked vehicles.

As known, the frontal seals generally comprise two rings made of metal or synthetic material, one of which slides on the other, with a certain pressure exerted by a resilient member, for instance of rubber.

In the conventional seals, which employ rings generally comprising a frusto-conical body provided in correspondence with the major base with an outwardly directed radial flange, the surface of which opposed to the ring body forms the friction surface between the two rings of the seal, the problem arises of preventing the resilient member, which exerts the pressure, from disengaging from the frusto-conical ring body, thereby making it difficult to assemble the seal.

Another problem relative to the resilient member is that it is necessary to give said member a sufficient robustness.

In order to solve these problems, according to the known technique it has been proposed to realize an outwardly directed radial flange also in correspondence with the minor base of the frusto-conical ring body, and to incorporate in the resilient member a strengthening metal member. In this way however the working costs became so high as to annul the technical advantages. In order to obviate these drawbacks, the applicant has conceived a seal which is cheap to manufacture, and in which the adherence between the ring and the resilient member is provided only by the friction between the suitably shaped contacting surfaces of the ring and of the resilient member. The shape of the surface of the resilient member provides also for its robustness, without the need to incorporate therein a strengthening element.

The seal according to the invention is very resilient to abrasion and is adapted to work in the presence of dust, water, sand and mud, which features render it particularly suitable for rollers of tracked vehicles.

The invention is characterized in that each ring of the seal comprises a round body, having a substantially cylindrical axial bore, and comprising a frusto-conical portion, provided along the cirumference of its major base with an outwardly directed radial flange having substantially plane and parallel surfaces, and a cylindrical portion adjacent to the frusto-conical portion and joined thereto in correspondence with the circumference of the minor base.

An annular resilient member is coaxially arranged on said ring, this member having a substantially frusto-conical axial bore, and comprising a portion of substantially trapezoid cross section, in which one of the non parallel sides is a generatrix of the side surface of the hole, and a portion of circular cross section which juts out from said side of the trapezoid portion adheres to the ring body. Advantageously at least the outer surfaces of the frusto-conical and cylindrical portions of each ring are worked so as to have a high friction coefficient with the material of the respective resilient member, whereas the flange surface, opposed to the ring body, is smooth, and more particularly lapped.

Further characteristics of the invention will clearly result from the following description, with reference to the accompanying drawings, in which.

Figure 1:
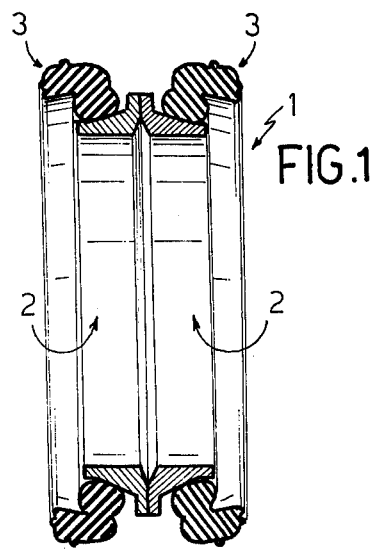
FIG. 1 is a cross-sectional view of the seal according to the invention.

As shown in FIG. 1, the seal according to the invention, generally shown at 1, comprises two sealing rings 2, each bearing a coaxially mounted resilient member 3.

Figure 2:
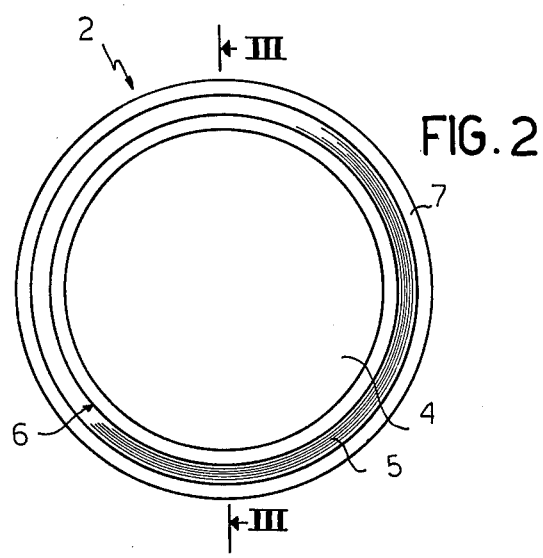
FIG. 2 is a plan view of a ring of the seal of FIG. 1.
Figure 3:
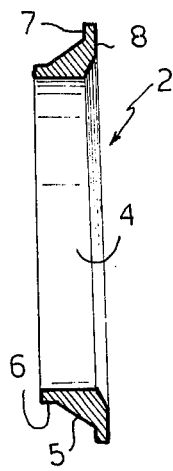
FIG. 3 is a cross-sectional view according to line III—III of FIG. 2.

Each ring 2 comprises (FIGS. 2 and 3) a round body having an axial bore 4 which allows to put the ring for instance on the track rollers, and comprising a frusto-conical portion 5 and a cyclindrical portion 6 joined to the frusto-conical portion in correspondence with the minor base thereof.

In correspondence with the major base of the frustum of cone 5, and along the whole circumference thereof, the ring 2 has moreover an outwardly directed radial flange the surfaces of which normal to the ring axis are substantially plane and parallel, at least in the portion closer to the outer edge of the flange 7.

In each ring 2 the flange surface 8 opposed to the ring body forms the friction surface between the two rings of the seal, and will be worked so as to reduce this friction at a minimum. Advantageously, in the case of meal rings, said surface may be lapped.

The opposed surface of flange 7, and the outer surfaces of portions 5, 6 of the body of the ring 2, are on the contrary worked so as to exert a high friction against the resilient member 3 which keeps the two rings of the seal against each other.

Figure 4:
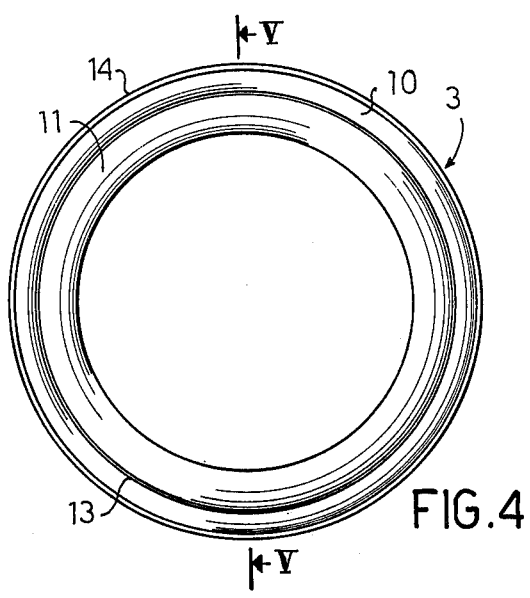
FIG. 4 is a plan view of a resilient member.
Figure 5:
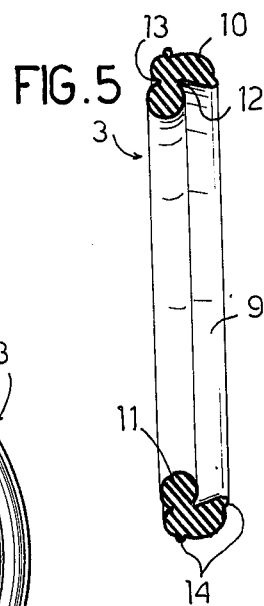
FIG. 5 is a cross-sectional view according to line V—V of FIG. 4.

FIGS. 4 and 5 show that such resilient member comprises a round body, having a substantially frusto-conical axial bore 9 which allows to put the resilient member 3 on the ring 2, with the major base of the hole directed towards the flange 7. Said body comprises a portion 10, whose section has the shape of a trapezoid and preferably of a right trapezoid in which one of the non parallel sides forms a generatrix of the side surface 12 of hole 9, and a portion 11 of circular cross-section, substantially tangent with the surface 12 of hole 9 and joined thereto by an appendage 13. The position of appendage 13 and the diameter of portion 11 are selected so that said portion just out of the plane of the major base of hole 9.

When the resilient member is mounted on ring 2, the portion 11 of circular cross-section adheres to the body of ring 2 substantially in correspondence with the junction line between the frusto-conical portion 5 and the cylindrical portion 6, and is maintained in this position by the friction exerted by the outer surface of ring 2, worked so as to be rough.

In this way there is no longer the need for shapes requiring an expensive working, such as that made necessary by the presence of the undercut, in order to prevent the resilient member from disengaging from the ring on which it has been mounted.

Moreover the particular shape of this member gives it very high characteristics of robustness, whereby it may be made for istance completely of rubber, without the need to employ strengthening metal members.

Still in order to increase the robustness, and also in order to obtain a better cooperation between the resilient member and the walls of the seats in which the seal is mounted, the outer wall of the trapezoid portion 10 of the resilient member 3 and the major base of said portion, are provided with annular ribs 14, advantageously of rounded cross-section. Said ribs also serve to provide a better lucricant-tightness towards the exterior of the seal.

Figure 6:
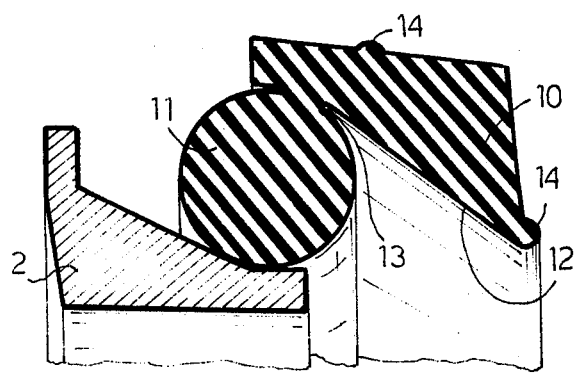
FIG. 6 is a section of a quarter of the seal in the state of rest.
Figure 7:
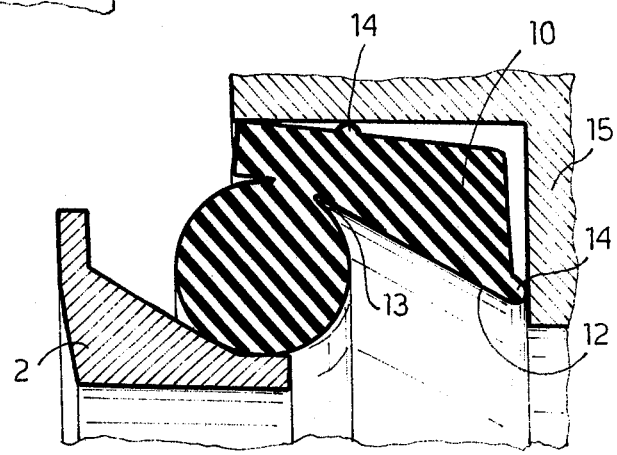
FIG. 7 is a section, similar to FIG. 6, of a quarter of the seal in the state of rest, showing also a portion of the box forming the seat therefor.
Figure 8:
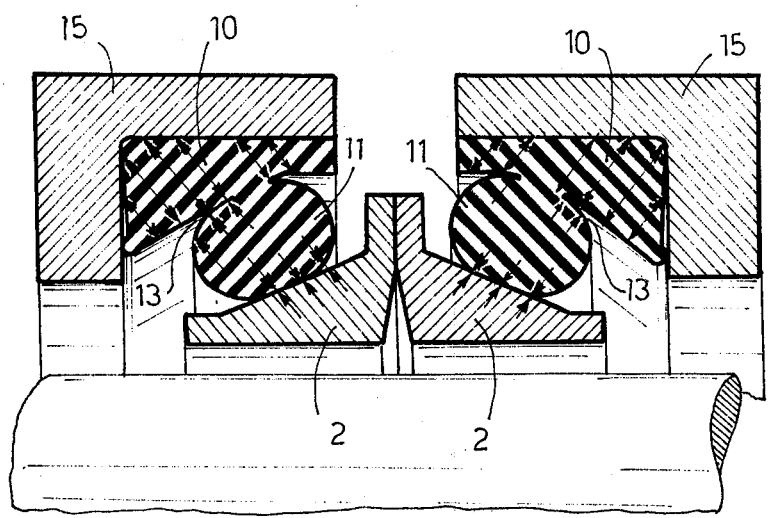
FIG. 8 shows a section of half a seal according to the invention, placed in its seat and subjected to the load.

As may be seen in FIGS. 6, 7 and 8, the appendage 13 connecting the portions 10 and 11 of the resilient member is protected from outside, particularly in the position of working (FIG. 8) when the portion 10 contacts box 15 so that said appendage is not in contact with abrading agents which may penetrate in the seal.

This characteristic feature represents a major improvement over the known seals of this kind.

The assembling of the resilient member obliges the trapezoid portion to undergo a deformation which cancels the L-shaped clearance existing between its back and the box 15 in position of rest.

In the assembled condition the seal placed under charge in the box 15 develops the following forces:

(a) an axial force which ensures a continuous elastic load of the sliding surfaces of the rings 2 through the cooperation of several forces, that is the pre-load force corresponding to the deformation of the portion 11 clamped between two inclined planes, and the reaction of portion 10 as it is compressed against the walls of the box 15;

(b) a radial inwardly directed force which is given by a wall of said box 11 which surrounds and compresses the ring 2 and the resilient member 3, ensuring a fluid-tight fit;

(c) an outwardly directed radial force which expands the element 3 within and against its seat (box 15) keeping it fixedly and ensuring a tight fit.

These forces are shown in FIG. 8.

It is still to be noted that the seal according to the invention may vary the elastic axial load in the following ways:

I - The load increases by increasing the diameter of the section of portion 11.

II - The load increases by decreasing the internal diameter of portion 11.

III - The load may be adjusted by varying the hardness of the mixture of elastomeric material forming the elastic member 3.

IV - It may be changed by modifying the trapezoidal section of said member 3.

V - It may be adjusted by modifying the inclination of the internal frusto-conical surface of member 3.

VI - The load increases by increasing the mean diameter of the internal frusto-conical surface of said member 3.

The above offers a wide range of choice in designing a seal for a given use.

It may also be declared that in some instances half a seal (comprising one ring 2 and one elastic member 3) may be satisfactorily used, while a wall of the box 15 acts as a second sliding surface.

It is clear that the described position of the appendage 13, which is the weakest part of the assembly protects it against light, sand, water, dust, mud avoiding that it may be exposed to wear and breakage.

I claim:

1. A frontal seal, in particular for tracked vehicles, at least a portion of said frontal seal being adapted to be mounted against the walls of a seat, said frontal seal comprising, in combination:

(A) a pair of sealing rings one of which is arranged to slide on the other with a predetermined pressure, each said sealing ring having an axial bore therethrough permitting said sealing rings to be mounted on the track rollers of the vehicle; a frusto-conical outer surface having a relatively high coefficient of friction and axially spaced apart major and minor bases; an outwardly directed flange having first and second substantially plane and parallel surfaces a first of which flange surfaces has a relatively high coefficient of friction and forms a junction with said major base of said frusto-conical outer surface, said second flange surface facing in a direction opposite said first flange surface and defining the end face of said frontal seal, said second flange surface having a relatively low coefficient of friction; and a cylindrical portion extending axially from said minor base of said frusto-conical outer surface in a direction away from said flange, said cylindrical portion terminating at the end of said sealing ring opposite said flange;

(B) a pair of resilient members one of which is mounted on said frusto-conical outer surface of each said sealing ring, each said resilient member including a body portion having a conical bore therethrough, the larger end of said conical bore being in opposition to said flange of said sealing ring in the assembled condition, said body portion having a quadrilateral section with an obtuse angle, that is defined, besides said frusto-conical surface, by an annulus directed towards said flange, by two further external frusto-conical surfaces, and a radially inwardly directed ring-like member of substantially circular cross-section, integral with and substantially tangent to said body portion; and (C) an appendage coupling said ring-like member to said body portion, said appendage being connected to said frusto-conical surface defining said conical bore in said resilient member at a location that is axially inward of the larger end of said conical bore, said appendage having a length and being located so as to be completely sandwiched and pressed between said ring-like member and said body portion in the assembled condition of said frontal seal, said position being a dead point in the assembled condition, said ring-like member being proximate the junction of said cylindrical member and said minor base of said frusto-conical outer surface of said sealing ring in assembled condition, said frontal seal developing, when forced against the wall of the seat under working conditions:

(a) an axial force resulting from the combination of a pre-load force corresponding to the deformation of said ring-like member clamped between said frusto-conical surface of said sealing ring and of said body portion of said resilient member, and of a reaction of said body portion compressed against the walls of the seat, said axial force ensuring a continuous elastic load of the sealing rings;

(b) a radially inwardly directed force produced by the wall of the seat surrounding and compressing said sealing ring and said resilient member, said radially inwardly directed force ensuring a fluid-tight fit; and (c) an outwardly directed force for expanding said resilient member within and against the wall of the seat, said outwardly directed force providing for keeping said resilient member fixed and for ensuring a fluid-tight fit.

* * * * *